United States Patent [19]

Pohl et al.

[11] Patent Number: 4,853,810
[45] Date of Patent: Aug. 1, 1989

[54] METHOD AND APPARATUS FOR CONTROLLING THE FLYING HEIGHT OF THE HEAD IN A MAGNETIC STORAGE UNIT

[75] Inventors: Wolfgang D. Pohl, Adliswil; James K. Gimzewski, Zurich; Paul R. Muralt, Gommiswald, all of Switzerland

[73] Assignee: International Business Machines Corporation, Armonk, N.Y.

[21] Appl. No.: 124,137

[22] Filed: Nov. 23, 1987

Related U.S. Application Data

[63] Continuation-in-part of Ser. No. 909,799, Sep. 22, 1986, abandoned.

[30] Foreign Application Priority Data

Nov. 19, 1985 [EP] European Pat. Off. ........ 85114668.8

[51] Int. Cl.$^4$ ..................... G11B 5/60; G11B 15/62; G11B 17/32
[52] U.S. Cl. .................................................... 360/103
[58] Field of Search ................... 360/102-103, 360/105, 97-99, 75, 86; 369/132, 126; 250/306; 365/114, 126

[56] References Cited

U.S. PATENT DOCUMENTS

| | | | |
|---|---|---|---|
| 4,343,993 | 8/1982 | Binnig et al. | 250/306 |
| 4,479,090 | 10/1984 | Frater et al. | 324/454 |
| 4,572,822 | 3/1986 | Quate | 365/126 |
| 4,605,977 | 8/1986 | Mathews | 360/103 |

FOREIGN PATENT DOCUMENTS

| | | | |
|---|---|---|---|
| 0252745 | 1/1988 | European Pat. Off. | 250/306 |
| 57-60566 | 4/1982 | Japan . | |
| 58-26324 | 2/1983 | Japan | 360/103 |
| 59-152558 | 8/1984 | Japan | 360/103 |

OTHER PUBLICATIONS

"Electrostatically Loaded Slider Bearing" by Lin et al., IBM/TDB, vol. 12, No. 7, Dec. 1969, p. 959.
"Capacitance Probe and Constant Q Circuit * * *", by Cupp, IBM/TDB, vol. 22, No. 1, Jun. 1979, p. 319-320.
"Piezoelectric XY Translator", by Bednorz et al., IBM/TDB, vol. 26, No. 10A, Mar. 1984, p. 4898-4899.
"Tunneling Through a Controllable Vacuum Gap", by Binnig et al., Appl. Phys. Lett., vol. 4D, No. 2 (Jan. 15, 1982), p. 178-180.

Primary Examiner—John H. Wolff
Attorney, Agent, or Firm—Thomas Berthold

[57] ABSTRACT

The method involves the steps of moving the magnetic head (8) to within aerodynamic distance from the electrically conductive surface (16) of rotating magnetic recording disk, further positioning of the head (8) until a tunnel current occurs across the gap between the head (8) and surface (16), and maintaining said tunnel current constant by using the deviations of the current from a predetermined value corresponding to a certain flying height.

The apparatus comprises a tunnel electrode (9) forming an integral part of the head assembly which is attached to a distance control mechanism (5) permitting the positioning of the head assembly with a one-nanometer accuracy. The tunnel electrode (9) has a very slightly beveled shoulder (45, 47) ensuring early detection of asperities approaching the head. Gradation of the potential between tunnel electrode (9) and surface (16) of the recording disk (3) is used to enhance the response to asperities.

9 Claims, 7 Drawing Sheets

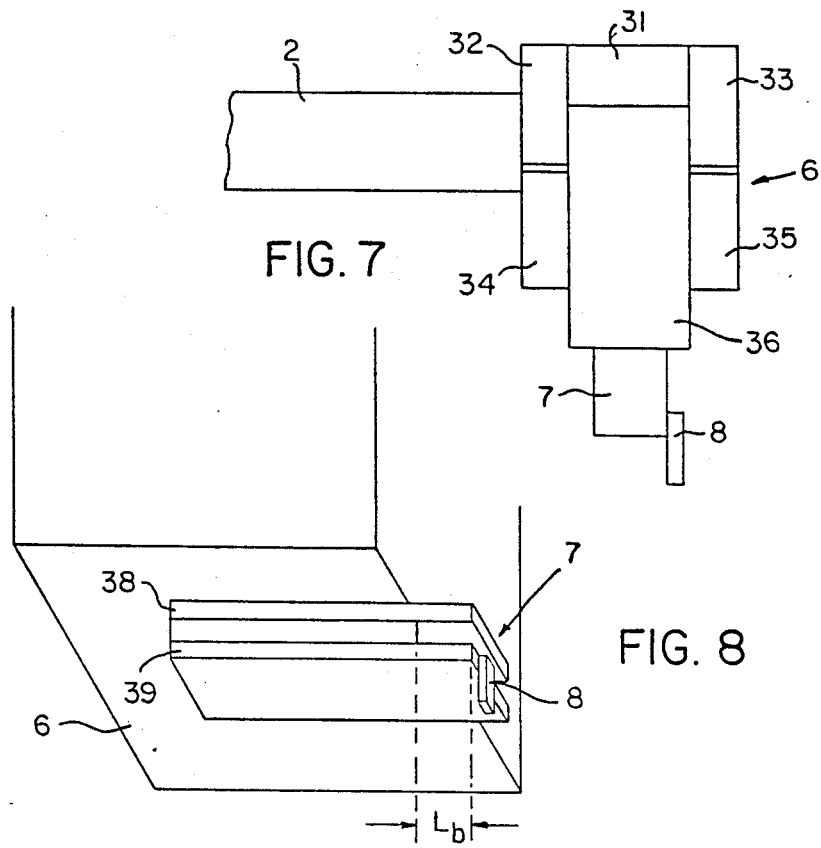
FIG. 7
FIG. 8
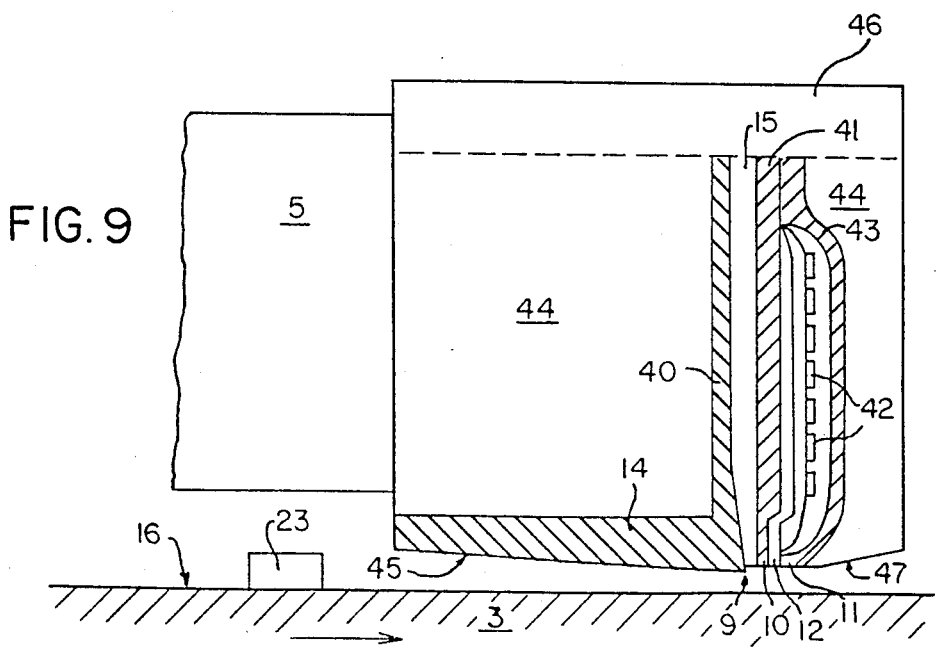
FIG. 9

METHOD AND APPARATUS FOR CONTROLLING THE FLYING HEIGHT OF THE HEAD IN A MAGNETIC STORAGE UNIT

This is a continuation-in-part of application Ser. No. 909,799 filed Sept. 22, 1986, now abandoned.

BACKGROUND OF THE INVENTION

The invention relates to a method for controlling the flying height of the magnetic head in a magnetic storage unit, and to an apparatus for performing this method.

Magnetic head assemblies that fly relative to magnetic storage media have been used extensively, particularly in disk files where the head assembly is attached to an actuator which moves the heads generally radially to access different concentric data tracks on the disk. The objectives for improving the non-contact transducing relationship between a magnetic head and a magnetic recording medium, such as a rotary disk, are to attain very close spacing between the head and the surface of the recording medium, and to maintain the attained spacing essentially constant. The head/surface spacing, usually called 'flying height' is one of the parameters which determine the maximum possible storage density. Other important parameters include the narrowness of the transducing gap and the thickness of the magnetic recording medium. Small flying height allows for high spatial frequency signals to be recorded, thereby affording high density recording. Additionally, by having a reduced flying height, regulated to a constant value, the amplitude of the signal being recorded or read out is thus improving signal resolution and making signal processing more reliable.

Traditionally, the flying of a magnetic head over the surface of a moving recording medium is regulated passively by adjusting the aerodynamic properties of the medium/head assembly, i.e. surface geometry, distance and velocity of relative displacement. While many known magnetic storage units rely on the air cushion that builds up naturally with disk rotation and relative displacement, other storage units use a forced air cushion generated by pressurized air exiting from a plurality of openings on the surface of the head facing the magnetic recording medium. With this air bearing technology flying heights down to about 300 nm having been achieved. However, further reduction of the flying height appears difficult with this technology.

The state of the art of magnetic recording on moving media is perhaps still best documented in R. E. Matik, *Computer Storage Systems and Technology,* John Wiley & Sons, N.Y., 1977, p. 342 ff.

SUMMARY OF THE INVENTION

In view of the limitations inherent in the conventional air bearing technology, it is an object of the invention to propose new ways for reducing the flying height in a controlled fashion so as to increase the storage density in moving magnetic storage devices.

The invention contemplates the exploitation of (quasi-) vacuum tunneling for controlling the flying height of the magnetic head assembly in magnetic storage units. With this technology, a drastic reduction of the flying height to values on the order of tens of nanometers and below and an ensuing increase of the storage density up to a factor of 10, possibly even larger, as compared to conventional storage devices should be within reach.

Tunneling through vacuum or air (="quasi-vacuum") is excellently suited to control distances in the range of 0.1 to 10 nm. The control mechanism is based on the tunnel resistance which varies exponentially with the size of the gap between two conductors if a potential difference exists between them. This control mechanism is the heart of the well-publicized Scanning Tunneling Microscope, as described in the article by G. Binnig, H. Rohrer, Ch. Gerber and E. Weibel in *Appl. Phys. Lett.* 40, 178 (1982).

Accordingly, the present invention proposes a method for controlling the flying height of the magnetic head above the surface of a moving recording medium in a magnetic storage unit, wherein said magnetic head is supported for random access of the tracks on said recording medium, the method being characterized by the following steps: lowering said magnetic head onto the surface of the moving recording medium to within aerodynamic distance, enforced further lowering of the head until a tunnel current starts flowing across the gap between said head and said recording medium as a result of a potential difference existing across said gap, and maintaining said tunnel current at a constant predetermined value corresponding to a predetermined flying height by using the deviations from said predetermined value to control the mechanical head support in a feedback loop.

The present invention further proposes an apparatus for controlling the flying height of a magnetic head above the surface of a rotating disk in a magnetic storage disk file, wherein said magnetic head is supported for random access of the tracks on said disk, the apparatus being characterized in that said head carries a tunnel electrode on its surface facing the disk, said tunnel electrode and said surface of the disk being electrically conductive and being connected to a source of electrical potential, and in that means are provided to measure the tunnel current flowing between said tunnel electrode and said surface, and to supply a signal derived from the deviations from a predetermined value of said tunnel current to the input of a positioning device at the support of said magnetic head.

Details of the inventive method and apparatus will be explained in the following description by way of example and with reference to the attached drawings.

BRIEF DESCRIPTION OF THE DRAWINGS

FIGS. 5 through 7 shows various embodiments of distance control mechanism;

FIG. 8 is an embodiment of the fine-approach unit;

FIG. 9 is a cross-section through a preferred embodiment of the head/tunnel electrode assembly in thin-film technology;

DESCRIPTION OF PREFERRED EMBODIMENT

For the purposes of the following specification, the recording medium will be assumed to consist of a rotary magnetic disk, although the invention can advantageously be applied to other forms of moving storage, such as tape or drum. The problem of constant, and very small, flying height is also present in non-magnetic storage, viz. in optical storage systems. The invention is likewise applicable to those systems.

The design of tunnel distance-regulated head/disk assemblies partially dwells on techniques developed for the Scanning Tunneling Microscope (STM). It differs from the STM in the need for a high data rate, namely above 10 Mbit/s. This is compensated by relaxed requirements with respect to variations of the flying height. The latter can be much larger than the tunnel distance, which is at maximum 3 nm; it only must not exceed the maximum allowed magnetic gap spacing lest the signal deterioration should become too strong. As a result, the maximum position regulation frequency can be kept well below the bit rate, for instance at 30 kHz, as will be discussed below.

In contrast to the STM where the topography of the sample is the main concern, tunnel distance regulation as applied to data storage has to correct for head/recording medium distance variations regardless of their origin, be that they result from surface asperities or from vibrations within the system.

Figure 1:
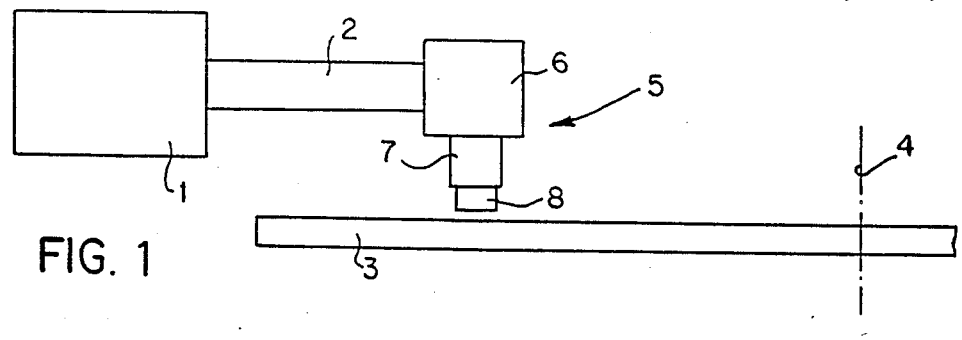
FIG. 1 is a schematic representation of the magnetic head and its distance control mechanism with which the present invention can be used.

The essential elements of a tunnel distance-regulated head spacing in a disk assembly are shown in FIG. 1. An actuator 1, such as a conventional voice coil motor (VCM), is energized to move an arm 2 in a direction radially with respect to a disk 3 which rotates about its axis 3. Arm 2 carries a two-stage distance control mechanism 5 comprising a coarse-approach unit 6 and a fine-approach unit 7. Attached to fine-approach unit 7 is a transducer 8, which for the purposes of this description is assumed to consist of a magnetic head of essentially conventional design but reduced size. Such a head comprises a magnetizable core with a coil wound thereon, the core having a gap of appropriate size, and the gap facing the tracks on magnetic disk 3. As in conventional disk storage units, actuator 1 is activated to extend or retract arm 2 so as to radially align magnetic head 8 with the tracks on disk 3.

Coarse-approach unit 6 lowers head 8 roughly into operating position, i.e. within 200 to 500 nm from the surface of disk 3. This corresponds to the order of magnitude of the head/disk spacing which can be achieved with conventional aerodynamic means where the head is made to fly on a cushion of air which moves toward the front side of the head as the disk rotates and which provides enough buoyancy to keep the head clear of the disk surface at an essentially constant distance.

Fine-approach unit 7 forces head 8 to further lower toward the surface of disk 3 to a predetermined operating distance which may be of the order of 3 nm. During operation, fine-approach unit 7 controls the flying height of head 8 within certain limits by moving the head up and down in approximate correspondence with the profile and surface of disk 3 has along the track which is presented to head 8. Fine-approach unit 7 may consist of several stages if that is advantageous to optimize its response to surface asperities.

Figure 2:
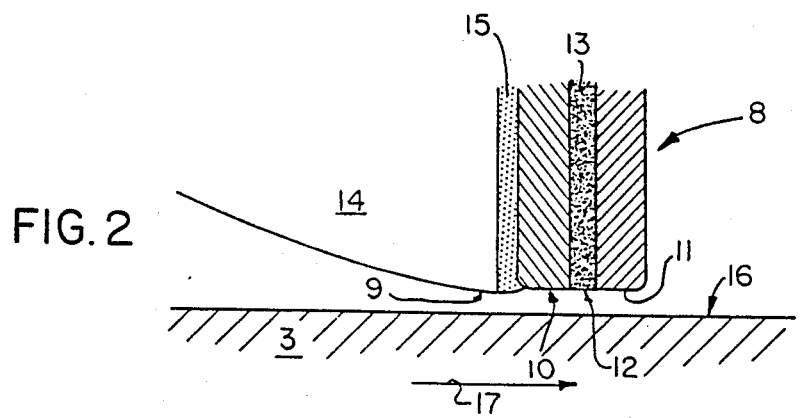
FIG. 2 shows the tunnel electrode/transducer assembly.

To control the head/disk spacing at a distance of about 3 nm, head 3 is equipped with a tunnel electrode 9, shown schematically in FIG. 2. The pole tips 10, 11 of the magnetic core of transducer 8 are almost flush with tunnel electrode 9; a little recession of pole tips 10, 11 is in order for safety reasons; it can amount to about 1 nm. Gap 12 between pole tips 10 and 11 is filled with the usual paramagnetic material, and the entire magnetic head 8 is separated from the body 14, of which electrode 9 is a part, by a suitable dielectric 15. As the surface 16 of disk 3 moves in the direction of arrow 17 past the body/head assembly, it is tunnel electrode 9 which first "sees" the asperities of surface 16. The control mechanism associated with electrode 9 will almost instantaneously lift or lower the body/head assembly in response to the characteristics of surface 16 to always maintain the predetermined flying height to guarantee uniform writing and reading, and to avoid a head crash.

It is in order at this point to briefly explain the tunnel effect and describe the tunnel electrode or tip. The following is quoted from U.S. Pat. No. 4,343,993, Binnig et al. at the locations indicated:

"According to the tunnel effect, there exists a calculable probability that a finite number of electrons bound by a potential can cross the tunnel barrier even at low voltage differences. A tunnel barrier may be provided by a thin layer in a solid body. A high vacuum may also represent a tunnel barrier when the high vacuum distance to be crossed is between a few and several hundred Angstroms. Some bound electrons are capable of tunneling through such distances. In experiments with vacuum tunnel barriers a very weak tunneling current has flowed from a fine conductive tip to a flat counter electrode when the tip is posed above the counter electrode within a small distance" (Col. 2, lines 9 through 22).

"The mechanical dimensions of the electrodes, sample and tip, as well as their possible ranges of adjustment are extraordinarily tiny because of the delicate nature of the vacuum tunnel effect. Electronic control equipment needs to be able to operate very precisely and the measuring equipment must be extremely sensitive. In a vacuum, the barrier to be crossed by bound electrons by tunneling lies in the order of magnitude of about 10 Angstroms (1 nm) to 100 Angstroms (10 nm). The tip electrode is moved above the sample at a distance from the sample of about the same order of magnitude. It may not strike against the sample and thus make conductive contact. It may also not get so far away from the surface of the sample that pure tunneling currents are no longer possible. The current density of the tunneling currents is on the order of 100 Amperes per square centimeter. However, due to the extraordinarily small dimensions, the tunneling currents which flow in reality are only about 10 to the minus 10 Amperes. The tip's radius of curvature in this case is in the order of magnitude of 1000 Angstroms (100 nm). By calculation it can be shown that about half of the tunneling current flows through a central region between the tip and sample having a diameter of only about 100 Angstroms (10 nm). In the outer direction, the current density decreases rapidly" (Col. 4, lines 25 through 48).

Since the tunnel effect is very sensitive to changes of the tunnel gap resistance, it is obvious to employ a constant current power supply to provide for the necessary electrical conditions at the tunnel gap. One suitable power supply is described in a paper by R. Young, J. Ward, and F. Scire, "The Topografiner: An Instrument for Measuring Surface Microtopography", *Rev. Sci. Instr.*, Vol. 43, No. 7, July 1972, pp. 999–1011, which is incorporated herein by reference. The operation of this power supply will be described below in connection with the feedback loop for maintaining the distance of the tip from the surface of the recording medium constant.

Figure 4:
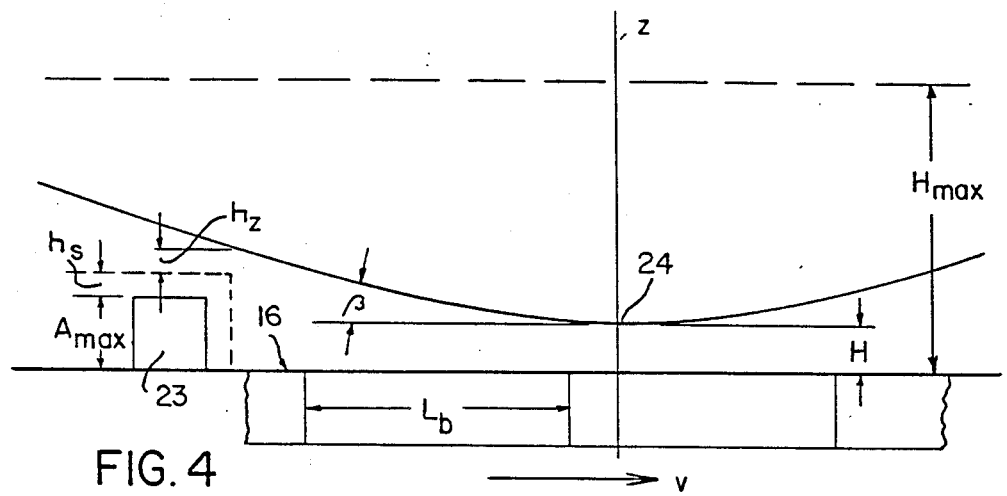
FIG. 4 is a diagram to explain the relations between the flying height of the magnetic head and the height of asperities ties.

The design of a control mechanism, or servo loop, compatible with the characteristics of the tunnel effect will now be described. A simple example for an effective control mechanism, although designed for use in connection with a field-emission tip (which operates at much large distances and, hence, requires considerably higher potentials) is described in the paper by R. Young, from which the following description is borrowed (page 1001, line 22 ff., FIG. 4, and wherein the terms "emitter" and "field emission probe device" were changed to "tip", and the reference numbers added to correspond to FIGS. 12 through 14).

Figure 13:
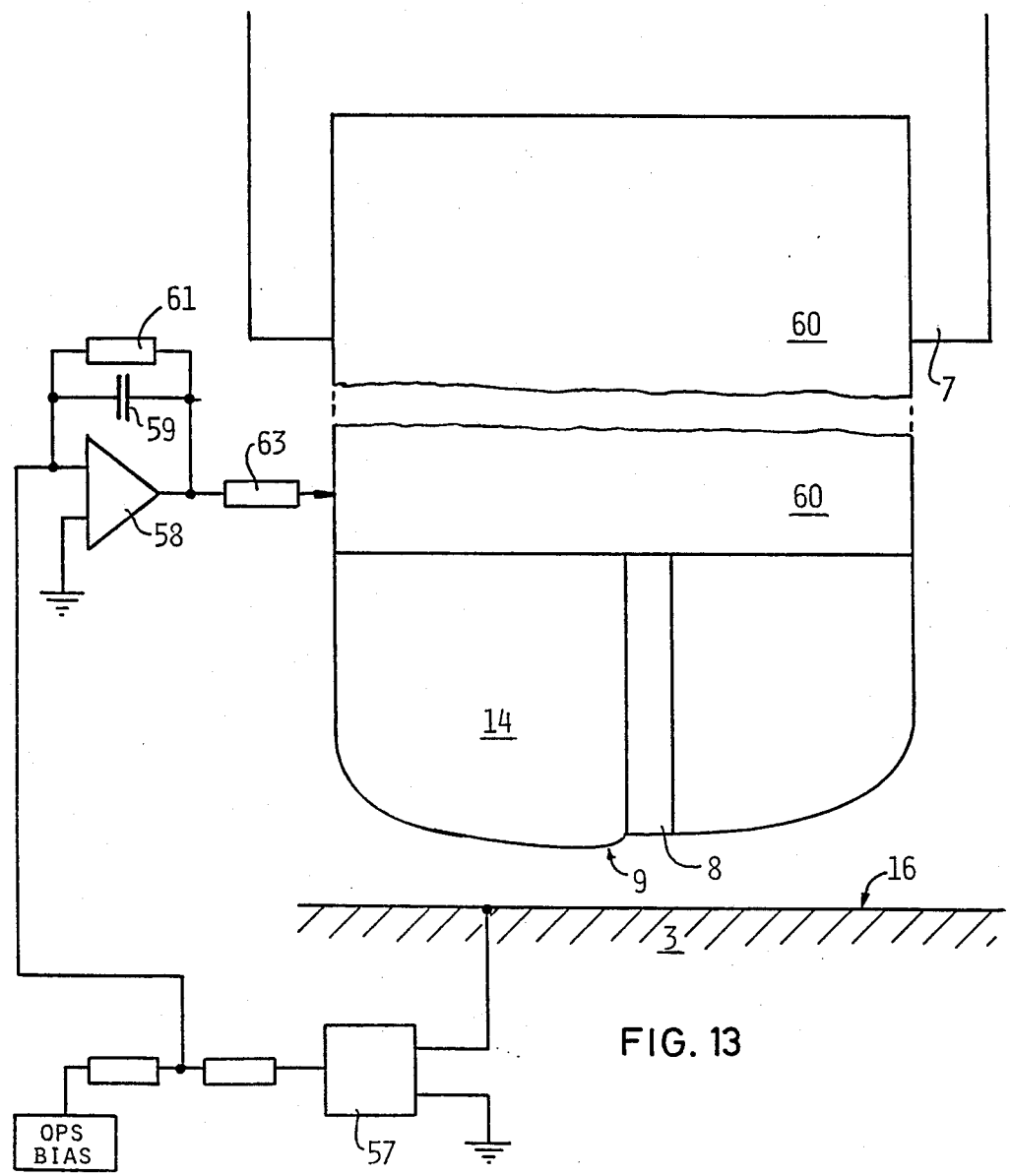
FIG. 13 shows the servo loop for controlling the height of the tunnel electrode above the disk surface.

The elements of the servo loop, shown in FIG. 13, which keeps the tip 9 a constant distance from the surface 16, include a constant current power supply 57, an operational amplifier 58, an RC element consisting of the piezo capacitance 59 (of the piezo element 60 of fine-approach until 7) and an interchangeable resistance 61, the piezo 60 itself, and the tip 9.

Figure 14:
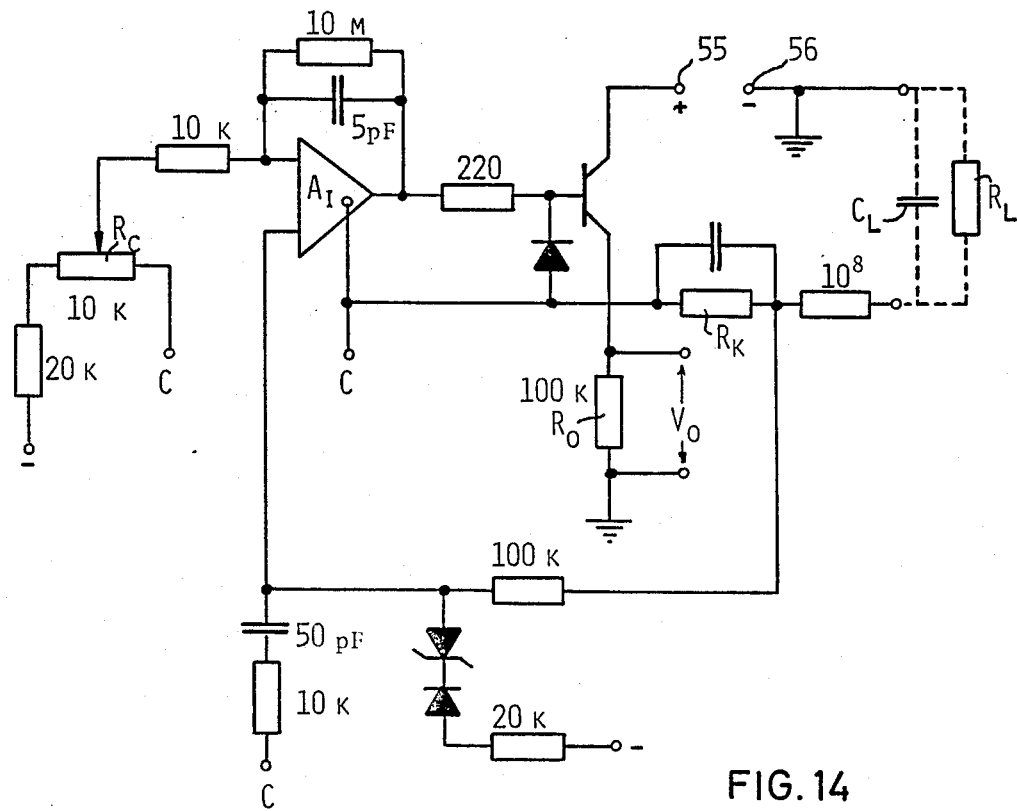
FIG. 14 shows the circuit diagram for the constant current power supply.

In the circuit diagram for the constant current power supply shown in FIG. 14, the tip 9 is represented by the variable load resistor $R_L$. The voltage drop across the current sensing resistor, $R_k$, resulting from the load current (=tunneling current) through it, is compared with a reference voltage produced by the current control potentiometer, $R_c$, at the input of the differential operational amplifier $A_I$. The amplified difference error voltage is applied to the base of the transistor which in turn supplies the controlled load current. It is the voltage across the load, $R_L$, that serves as the control voltage for the servo loop. However, since $R_L$ is a very high resistance, a proportional output voltage is made to appear across a more practical lower resistance, $R_O$. Also, for operating load currents smaller than $10^{-6}$ A, the branch containing resistor $R_O$ carries the excess or difference between the load current and the $10^{-6}$ A cutoff current of the output transistor.

With this feature the supply 57 can deliver a constant current from $10^{-2}$ to $10^{-10}$ A with up to 300V compliance. The voltage across $R_O$ can also be used as a guard voltage to prevent leakage current in the wiring to the load, $R_L$.

In the circuit shown in FIG. 14, the response time for a change of current at the load due to a change of reference voltage at $R_C$ is dependent on the product of the load resistance, $R_L$, and its shunt capacitance, $C_L$. For example, if the load resistance has a value of $10^9$ Ohms and a shunt capacitance of 10 pF, the time constant would be $10^{-2}$ sec. For an output of 100V, the slewing rate would be about 5V/msec. A sizable improvement in this response time can be achieved by a compensating capacitor across $R_K$.

The operational amplifier 58 has a gain of 40 and a frequency response flat from dc to 4000 Hz. This amplifier drives the piezo unit 60 through a resistor 63 which, in combination with the inherent piezo capacitance of 1000 pF, determines the time constant of the servo loop.

To sum up, if tip 9 encounters an asperity on the surface 16 of recording medium 3, the conditions at the gap between the two change to generate a deviation signal in the form of a variation of the voltage drop across sensing resistor $R_K$ (FIG. 14) which, in turn, causes a corresponding variation of the voltage drop across resistor $R_O$, and the latter is used to control one input of operational amplifier 58 of the feedback loop (FIG. 13). The output voltage of operational amplifier 58 then causes piezo element 60 of fine-approach unit 7 to either contract or expand so as to readjust the distance between tip 9 and surface 16 to the value existing prior to the arrival of the asperity, and corresponding to the original value of the tunneling current, as determined by the setting of the current control potentiometer, $R_C$.

While the tunnel electrodes used in Scanning Tunneling Microscopy are usually very thin, pointed needles with the radius of curvature at the apex thereof being as small as can be fabricated, it has been found preferable in the application of this invention to use a tunnel electrode with very slightly tilted slopes. The reasons for preferring a truncated electrode will now be explained with reference to FIG. 3.

Electrode 9 has the form of a very flat wedge with slightly rounded apex. The surface of electrode 9 may be considered as smooth; atomic-size microtips may exist but are of minor importance in this connection. The material of the electrode is selected for stability against corrosion and wear; it should be a reasonably good conductor. Good results have been obtained with gold/bismuth alloys and with glassy carbon. The electrode material should also have a very small work function in order to allow for large tunnel distances. A small work function can be achieved by certain organic or oxide adhesion layers. They are not shown in FIG. 3. The entire electrode/head assembly (FIG. 2) can be fabricated in thin-film technology.

Magnetic disk 3 carries a thin layer 18 of magnetizable material disposed in some carrier medium, as is well known in the art. Layer 18 allows for small bit size to exploit the high recording density capability afforded by the tunnel distance-regulation. The disk surface is covered with a stable, non-corrosive, conducting film 19 having a very small work function. A gold film of less than 5 nm thickness for example provides electrical conduction but in no way affects the magnetic recording properties of the underlying layer 18 of magnetizable material. The surface of disk 3 can be made flat, e.g. by polishing, to approximately 20 nm over ranges of 2 to 5 $\mu$m, which is standard optical quality.

Even at the flatness indicated above, the surface 16 of disk 3 still consists of flat areas 20, gently corrugated areas 21, holes 22, and small protrusions 23.

Figure 3:
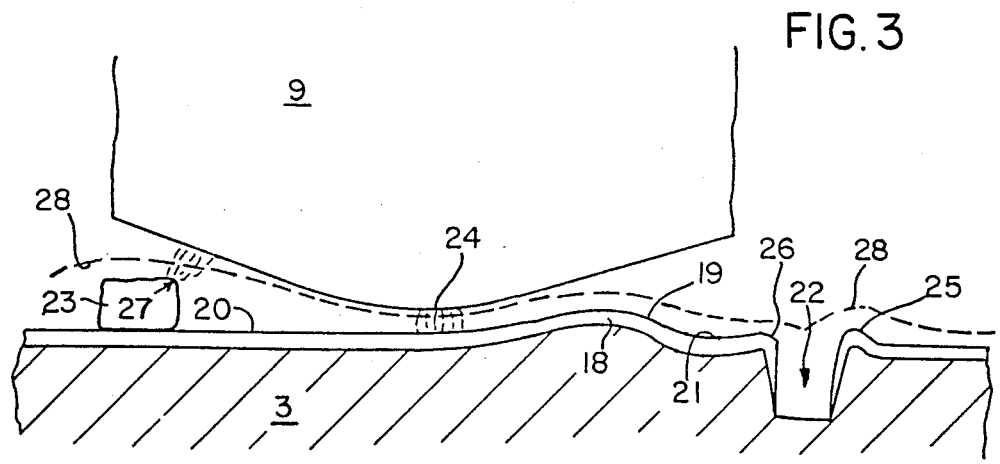
FIG. 3 represents a cross-section through a recording medium to indicate the various types of asperities which may occur.

If electrode 9 is over a flat area 20, as shown in FIG. 3, its distance from surface 16 of disk 3 is shortest at the electrode's apex 24, the latter then being the source of the tunnel current indicated by dotted lines in FIG. 3.

Over a gently corrugated area 21, the place of shortest distance and, hence, origin of the tunnel current, wanders off from the apex 24 by a small increment depending on the inclination of the slope and shape of electrode 9.

Over a hole 22, the tunnel current first remains stable at the value it had while the electrode 9 passed over point 25, then the tunnel current jumps to the value associated with point 26 while electrode 9 dives into hole 22 by an amount depending on its slope and the width of hole 22. This behavior has been verified experimentally.

Upon approach of a protrusion 23, the place of origin of the tunnel current locks onto the rim 27 of the protrusion. This locking of the tunnel current occurs whenever the tilt angle of a feature on the disk surface 16 exceeds the apex angle of electrode 9.

The dashed line 28 represents the path of tunnel electrode 9 in the coordinates of the spinning disk if all inertial effects are ignored, i.e. when the disk rotates very slowly. Line 28 reproduces the topography of surface 16 with the constraint of a mechanical "slew rate" limitation: slopes steeper than the apex angle are replaced by ramps as indicated near hole 22 and protrusion 23.

Under operating conditions, the fast motion of disk 3 necessitates abrupt retract maneuvers upon the approach of asperities in order to avoid collision. The dynamics requirements for retraction may be summarized in the following manner, with reference to FIG. 4. The position control system recognizes the approach of an asperity, through sudden increase of the tunnel current when the distance $h_z$ between the asperity 23 and the sidewall of electrode 9 becomes equal to the operating tunnel distance $d_t$. The electrode then has to quickly retract such that $h_z$ never becomes smaller than a safety margin $h_s$ while the asperity passes under tunnel electrode 9.

In response to the recognition of an asperity 23, the entire electrode unit 7, 8, 9, 14 begins to retract with an acceleration b which can be assumed as constant for the purposes of a semi-quantitative estimate. If h(t) is the flying height over time, then $$h(t) = \frac{b}{2} \cdot t^2$$

The value of b is influenced by the condition that the flying height should never be smaller than a certain safety margin, say 1 nm. With a safety factor of 3, h(t) should be at least 3 nm at all times. This leads to a constant acceleration of b=6 nm/s². Relating b to the maximum response frequency $f_{max}$ and to the maximum amplitude $a_{max}$ of the fine-approach unit 7 in accordance with the equation $$b = 4\pi^2 \, a_{max} \cdot f_{max}^2$$

and considering that the maximum acceleration $b_{max}$ obtains for $$b_{max} = \frac{\beta^2 \cdot v_d^2}{2 \, d_t - d_s},$$

wherein $\beta$ is the wedge angle of electrode 9, $v_d$ is the velocity of disk 3 and $d_s$ is the safety margin mentioned before.

Equalization of these equations yields:

$$f_{max} = \frac{\beta \, v_d}{2\pi \, 2 \, a_{max} \, (d_t - d_s)}$$

comparing $f_{max}$ with the bit rate $N_b$ leads to $$\frac{f_{max}}{N_b} = \frac{\beta}{2\pi} \cdot \frac{L_b}{2 a_{max} \, (d_t - d_s)},$$

with $L_b$ being the bit length on disk 3.

A possible implementation of fine approach unit 7 is a cantilever-mounted piezoelectric "bimorph" or "bender" element.

A specific bender which is commercially available under the designation G-1195, thickness 0.5 mm, from Piezoelectric Products, Inc., has an $f_{max}=239$ kHz/$1_b^2$ and an $a_{max}=(1.32$ nm/V$) (U_b) (1_b^2)$, where $1_b$ is the length of the bender element in millimeters and $U_b$ is the operating voltage in volts. Using these values with a $1_b=1.6$ mm long bender and an operating voltage $U_b$ of 50V, one obtains $f_{max}=90$ kHz and $a_{max}=175$ nm. Entering these values and a bit rate of 10 Mbit/s into the last equation requires a $\delta \sim 2°$, i.e. a fairly flat tunnel electrode which is easy to manufacture.

The piezoelectric effect is known to be fast enough for responses up to several hundred kilohertz. Also, there are reserves in the voltage which could be raised up to 180V. The amplitude $a_{max}$ of almost 200 nm is comfortable with respect to the expected height of asperities on a well-polished surface.

Returning to FIG. 1, coarse-approach unit 6 is actuated at the beginning and end of a reading or writing operation or whenever the actual flying height drifts beyond the operating range of fine-approach unit 7. For approaching, transducer 8 is supposed to start at a large distance and be gradually lowered by both coarse-approach unit 6 and fine-approach unit 7 until tunneling occurs. Then coarse-approach unit 6 gets fixed. (In specific embodiments, it may continue to make slow control motions in accordance with the low frequency tail of the tunnel distance error signal.) Coarse-approach unit 6 may take one of three preferred embodiments.

Figure 5:
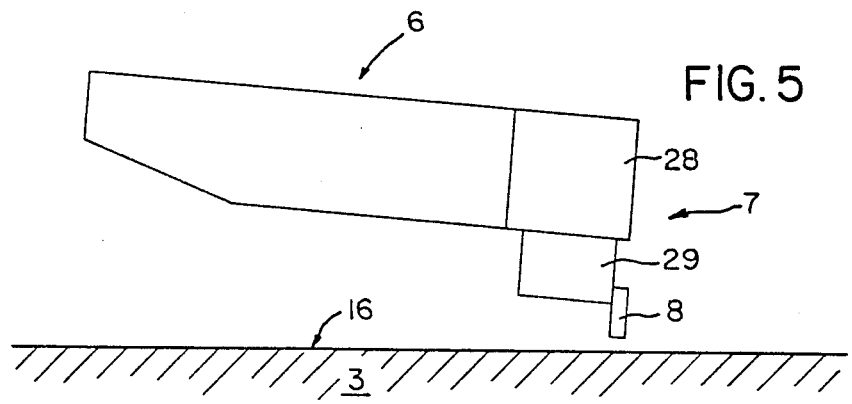

(a) As a passive aerodynamic slider, FIG. 5 shows the arrangement where coarse-approach unit 6 flies on an air cushion at a submicrometer distance like in conventional disk storage units. Fine-approach unit 7 preferably has two stages, designated 28 and 29 respectively, to provide for a large dynamic range.

Figure 6:
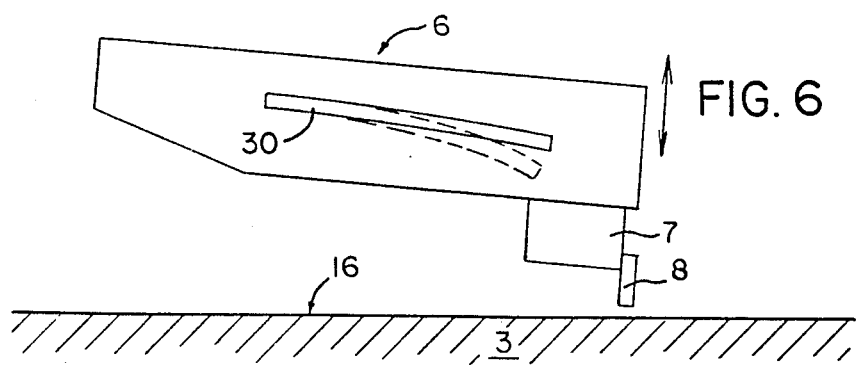

(b) As an active aerodynamic slider, in FIG. 6, coarse-approach unit 6 is designed as a slider equipped with an aerodynamic wing 30 permitting active regulation of the air cushion thickness through shaping of the body of unit 6. This design is well suited for an implementation in micromechanical technology using silicon.

(c) As a piezoelectric stepper translator, FIG. 7 shows a schematic representation of the translator 6 which may be a simplified version of the translator disclosed in *IBM Technical Disclosure Bulletin*, Vol. 26, No. 10A, p. 4898 (1984). A support 31 having clamps 32 through 35 receives a gliding element 36 within a channel 37 formed by clamps. Gliding element 36 consists of a piezoelectric crystal to which fine-approach unit 7 carrying transducer 8 is attached. Clamps 32 through 35 are actuated or released in pairs (32, 33; 34, 35) as gliding element 26 contracts or extends. The design in accordance with FIG. 7 is well suited for vacuum operation where the designs of FIGS. 5 and 6 for obvious reasons cannot be used.

Fine-approach unit 7 has to complete the positioning of the transducer 8 to within one nanometer and minimize variations in flying height which result from corrugations at the disk surface, vibrations of the head/disk assembly, and slow drifts in temperature and pressure, etc. Piezoelectric positioners are most appropriate as they can be made sufficiently small, precise, and simple to operate. The design of fine-approach unit 7 follows from the dynamics and amplitude of response as discussed before. A favored embodiment would use a micromechanical structure processed from a silicon wafer. This technique is described in European Application No. 85102554.4.

FIG. 8 shows a more conventional embodiment of fine-approach unit 7 with a pair of cantilever-mounted piezoelectric bimorphs 38, 39 attached to the body of coarse-approach unit 6. The free length of bimorphs 38, 39 is $l_b = 1.6$ mm. The first bending mode which is the lowest-order elastic resonance, occurs at 90 kHz, as discussed before. The deflection sensitivity is 3.5 nm/V which provides the above-mentioned maximum deflection amplitude of 175 nm at the operating voltage of 50V. The two benders 38, 39 are oppositely poled so as to generate opposite momenta at any point in time, resulting in a recoil-free operation of fine-approach unit 7. Lower bimorph 39 carries the transducer/tunnel electrode assembly 8 through 11, 14 at its end.

Figure 10:
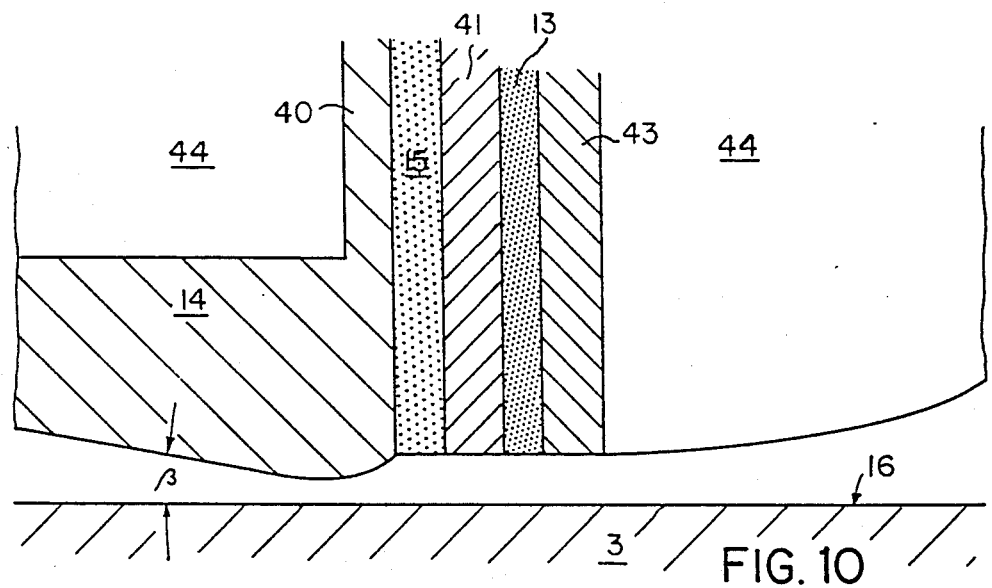
FIG. 10 is a cross-section through the transducer region of the head assembly at extreme magnification.

The transducer/tunnel electrode assembly 8 through 11, 14 is designed in thin-film technology as shown schematically in FIGS. 9 and 10. Its main parts are the flat tunnel electrode 9 and the pole tips 10 and 11. Tunnel contact 40 is well insulated by dielectric 15 (cf. FIG. 2) from a rear magnetic layer 41, windings 42, and front magnetic layer 43. Magnetic layers 41 and 43 together with a paramagnetic layer 13 between them, and windings 42 form a thin-film magnetic head similar to state-of-the-art technology. Its dimensions are miniaturized to cope with the decreased bit size on disk 3.

The parts making up the transducer/tunnel electrode assembly are embedded in a matrix 44 which provides the necessary stiffness to the assembly. The lower end face thereof, including the beveled shoulder 45 of body 14, tunnel electrode 9 and pole tips 10 and 11, has to be flat within less than 2 nm. The inclination of shoulder 45 should extend over a distance of at least $A_{max}/\beta$ ($A_{max}$=maximum asperity height), i.e. $\geq 2$ μm. The inclined sidewalls of tunnel electrode 9 need not be completely plane but should be smooth within the safety distance, i.e. approximately 1 nm. A cylindrical shape for the tunnel electrode is preferred over a prismatic or rooftop shape because of the better smoothness (no corners).

The upper part 46 of the transducer/tunnel electrode assembly may serve for electrical contacting and signal processing purposes.

Figure 11:
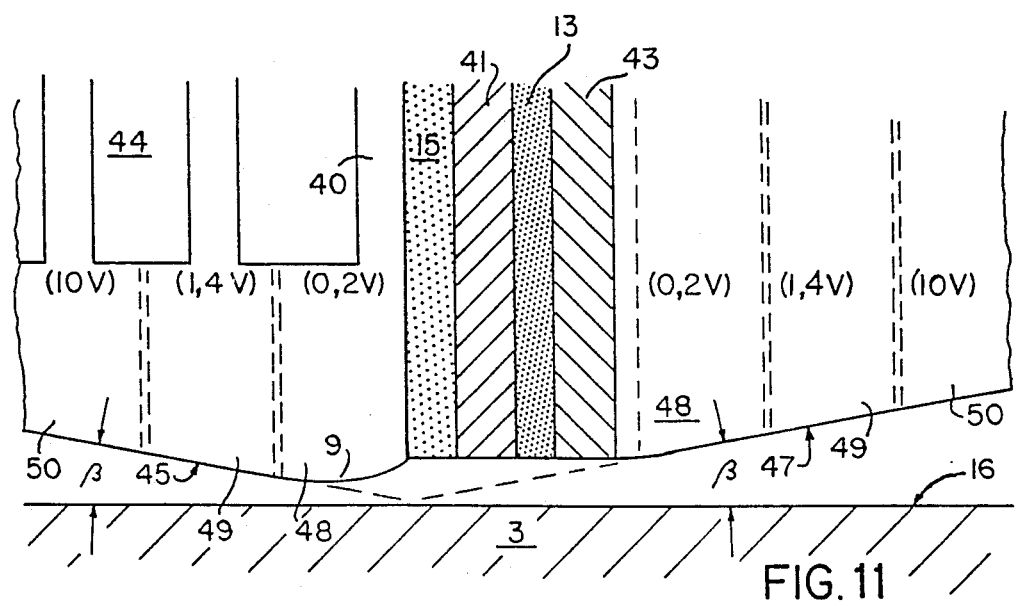
FIG. 11 shows the transducer region of FIG. 10 with graduated potentials.

In a preferred embodiment of the transducer/tunnel electrode assembly, shown in FIG. 11, the lower surface of the assembly is given the same inclination $\beta$ on the rear side that it has on the front side (with respect to the asperities arriving on the rotating disk). This has been found advantageous because it prevents the loss of the tunnel contact after the head has flown over an asperity and, hence, avoids possible overshooting the correction which otherwise might have caused a surface crash.

A further improvement of the operating characteristics of the transducer/tunnel electrode assembly, namely a considerable shortening of the response time, is possible if the electrical potential at the shoulder 45 of body 14 is gradated. FIG. 11 shows that this principle is applied to both the front and rear shoulders 45 and 47, respectively, in that three different potentials with increasing values (of e.g. 0.2V, 1.4V and 10V) are applied at three sections 48 through 50 of said shoulders 45 and 47, with the lowest potential at the innermost section 48 that includes tunnel electrode 9, and the highest potential at those sections 50 which are farthest from the tunnel electrode.

While the lower potential is sufficient to maintain the tunnel effect operative, the higher potential at the sections 50 most distant from tunnel electrode 9 makes them work in the field-emission mode. This mode is effective at distances above 20 nm, and thus permits approaching asperities to be recognized much sooner than is possible with the tunnel potential applied alone.

Figure 12:
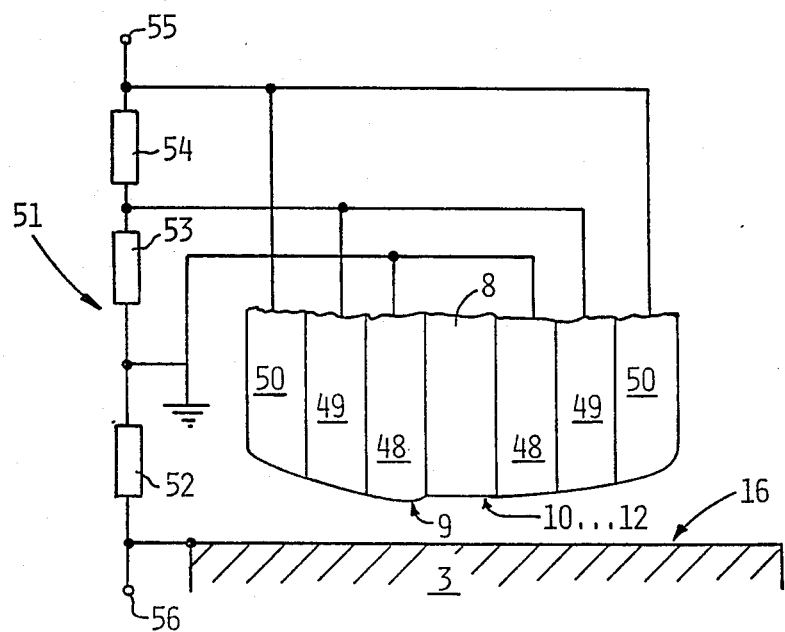
FIG. 12 shows the means for providing different voltage potentials to different sections of the tunnel electrode.

Referring now to FIG. 12, a voltage divider 51 provides the appropriate potentials at sections 48 through 50. Voltage divider 51 consists of resistors 52, 53, and 54 which, for example, may have resistances, respectively, of 20 kohms, 120 kohms and 860 kohms in order to supply potentials of 0.2V, 1.4V and 10V, respectively, at said sections against the surface of the record medium, assuming, for example, that the total voltage across divider 51 is 10V. It should be understood that terminals 55 and 56 in FIG. 12 may be connected to the corresponding terminals in FIG. 14.

What is claimed is:

1. A method for controlling the flying height of a magnetic head above the surface of a rotating magnetic recording disk in a disk file of the type wherein the magnetic head is supported on an aerodynamic slider, the slider being movable generally radially across the disk for access of the data tracks on the recording disk, the method comprising the steps of:
   moving the slider toward the surface of the rotating disk to within the required aerodynamic distance;
   moving the magnetic head toward the surface of the disk until a tunnel current starts flowing across the gap between the head and the surface of the disk as a result of a potential difference existing across the gap;
   sensing deviations of the tunnel current from a predetermined value; and
   maintaining the head at essentially a predetermined flying height in response to the sensed tunnel current deviations.

2. An apparatus for controlling the flying height of a magnetic head above the surface of a rotating magnetic recording disk in a disk file of the type wherein the magnetic head is supported on an aerodynamic slider, the slider being movable generally radially across the disk for access of the data tracks on the disk, and wherein the surface of the disk is electrically conductive, the apparatus comprising:
   an electrically conductive tunnel electrode attached to the slider and facing the disk surface;
   a source of electrical potential connected to the tunnel electrode and the disk surface;
   means for measuring the tunnel current flowing between the tunnel electrode and the disk surface and for sensing deviations of the measured tunnel current from a predetermined essentially constant value corresponding to a predetermined head flying height; and means connecting the head and tunnel electrode to the slider for positioning the head and tunnel electrode toward or away from the disk surface in response to the sensed tunnel current deviations, whereby the flying height of the head is maintained essentially constant.

3. An apparatus in accordance with claim 2 wherein the magnetic head has pole tips recessed by a distance of between approximately one and five nanometers with respect to the tunnel electrode.

4. An apparatus in accordance with claim 2 further comprising dielectric means located between the tunnel electrode and the magnetic head.

5. An apparatus in accordance with claim 2 wherein the head and tunnel electrode are mounted to the slider so as to be generally adjacent to one another, and wherein the surface of the adjacent head and tunnel electrode facing the recording disk has a partial generally cylindrical contour with a midline and shoulders spaced from the midline, the generally cylindrical contour facing the disk surface with its longitudinal axis oriented perpendicular to the direction of motion of the recording disk relative to the head and tunnel electrode.

6. An apparatus in accordance with claim 5 wherein the head has pole tips facing the disk and located generally at the midline of the generally cylindrical contour of the surface of the adjacently mounted head and tunnel electrode, and wherein the shoulders of the generally cylindrically contoured surface are beveled at an angle of between approximately 1 to 10 degrees from the midline.

7. An apparatus in accordance with claim 5 wherein the tunnel electrode includes a tunnel electrode at each shoulder, and wherein each of the shoulders is divided into a plurality of tunnel electrode sections, each section being connected to an electrical potential of a different value.

8. An apparatus in accordance with claim 7 wherein the electrical potential source includes means for applying the lowest electrical potential to the tunnel electrode section nearest the midline and the highest electrical potential to the tunnel electrode section farthest from the midline.

9. An apparatus in accordance with claim 2 wherein the positioning means further comprises a piezoelectric bender element.

* * * * *